United States Patent
Zwiggelaar et al.

(10) Patent No.: US 8,913,795 B2
(45) Date of Patent: Dec. 16, 2014

(54) IDENTIFICATION OF TEXTURE CONNECTIVITY

(75) Inventors: Reyer Zwiggelaar, Llanafan (GB); Harry Strange, Carmarthen (GB)

(73) Assignee: Aberystwyth University, Aberystwyth, Ceredigion (GB)

( * ) Notice: Subject to any disclaimer, the term of this patent is extended or adjusted under 35 U.S.C. 154(b) by 342 days.

(21) Appl. No.: 13/512,525

(22) PCT Filed: Nov. 25, 2010

(86) PCT No.: PCT/GB2010/002180
§ 371 (c)(1),
(2), (4) Date: Dec. 28, 2012

(87) PCT Pub. No.: WO2011/064546
PCT Pub. Date: Jun. 3, 2011

(65) Prior Publication Data
US 2013/0101179 A1 Apr. 25, 2013

(30) Foreign Application Priority Data
Nov. 30, 2009 (GB) .................. 0920995.8

(51) Int. Cl.
*G06K 9/00* (2006.01)
*G06T 7/40* (2006.01)

(52) U.S. Cl.
CPC ......... *G06T 7/40* (2013.01); *G06T 2207/30004* (2013.01)
USPC ........................................ 382/108; 382/205

(58) Field of Classification Search
USPC .......................................... 382/108, 173, 205
See application file for complete search history.

(56) References Cited

U.S. PATENT DOCUMENTS

| 6,097,854 A * | 8/2000 | Szeliski et al. ............. 382/284 |
| 7,106,348 B2 * | 9/2006 | Matsumoto et al. ......... 345/640 |
| 8,384,911 B2 * | 2/2013 | Nomura et al. ............. 356/610 |

OTHER PUBLICATIONS

Hartigan, J. A. et al., "Algorithm As 136: A K-Means Clustering Algorithm", Journal of the Royal Statistical Society. Series C (Applied Statistics), vol. 28, No. 1 (1979), pp. 100-108.
Hotelling, Harold, "Analysis of a Complex of Statistical Variables into Principal Components", Columbia University, Journal of Educational Psychology, pp. 417-441.
Graham, R. L. et al., "On the History of the Minimum Spanning Tree Problem", Annals of the History of Computing, vol. 7, No. 1, Jan 1985. pp. 43-57.
Kruskal Jr., Joseph B, "On the Shortest Spanning Subtree of a Graph and the Traveling Salesman Problem", Proceedings of the American Mathematical Society, vol. 7, No. 1, Feb. 1956, pp. 48-50.
Lawson, Charles L et al., "Classics in Applied Mathematics", Pub. 1995, Pertinent Chapters: 2-4.

* cited by examiner

*Primary Examiner* — Shefali Goradia
(74) *Attorney, Agent, or Firm* — Maier & Maier, PLLC

(57) ABSTRACT

A method for identifying the connectivity of texture types represented in a digital image comprising pixels, each pixel having a texture value which is representative of texture at a respective position, the method comprising: partitioning the texture values into local neighborhoods of texture values; determining a directionality for each neighborhood; using the directionality of the neighborhoods to determine their nearest neighborhood or neighborhoods; connecting the neighborhoods with their nearest neighborhood or neighborhoods; and determining the connectivity of the texture types of the digital image based on the connections formed between neighborhoods.

11 Claims, 9 Drawing Sheets

US 8,913,795 B2

IDENTIFICATION OF TEXTURE CONNECTIVITY

RELATED APPLICATIONS

This is the U.S. national stage application which claims priority under 35 U.S.C. §371 to International Patent Application No.: PCT/GB2010/002180, filed Nov. 25, 2010, which claims priority to United Kingdom Patent Application No. 0920995.8, filed Nov. 30, 2009, the disclosures of which are incorporated by reference herein their entireties.

FIELD

The present invention relates to identifying the connectivity or topology of texture types represented in digital images, for example digital images comprising medical imaging data (e.g. magnetic resonance imaging (MRI) data). The identification of connectivity of texture types is important in a range of applications including the representation of tissue texture to assist in identifying abnormal growth such as cancerous growth, for example in the prostate gland.

BACKGROUND

One known technique to identify the connectivity of texture types is for a specialist such as a radiologist to analyse an image such as an MRI image.

The present invention seeks to provide a more automated technique.

SUMMARY

One aspect of the present invention provides a method for identifying the connectivity of texture types represented in a digital image comprising pixels. Each pixel has a texture value which is representative of texture at a respective position. The method comprises: partitioning the texture values into local neighbourhoods of texture values; determining a directionality for each neighbourhood; using the directionality of the neighbourhoods to determine their nearest neighbourhood or neighbourhoods; connecting the neighbourhoods with their nearest neighbourhood or neighbourhoods; and determining the connectivity of the texture types of the digital image based on the connections formed between neighbourhoods.

In embodiments of the present invention digital images may comprise medical data/medical imaging data, and optionally medical data of soft tissue such as magnetic resonance imaging data.

Another aspect of the present invention provides a system comprising a memory and a processor, wherein the processor is arranged to perform one or more of the above methods.

Another aspect of the present invention provides a computer-readable medium having computer-executable instructions adapted to cause a computer system to perform one or more of the above methods.

Accordingly, a more automated technique is provided.

Other aspects and features of the present invention will be appreciated from the following description and the accompanying claims.

BRIEF DESCRIPTION OF THE DRAWINGS

Embodiments of the present invention will now be described, by way of example only, with reference to the accompanying drawings in which like reference numerals are used to depict like parts. In the drawings.

DETAILED DESCRIPTION OF EMBODIMENT(S)

Figure 1:
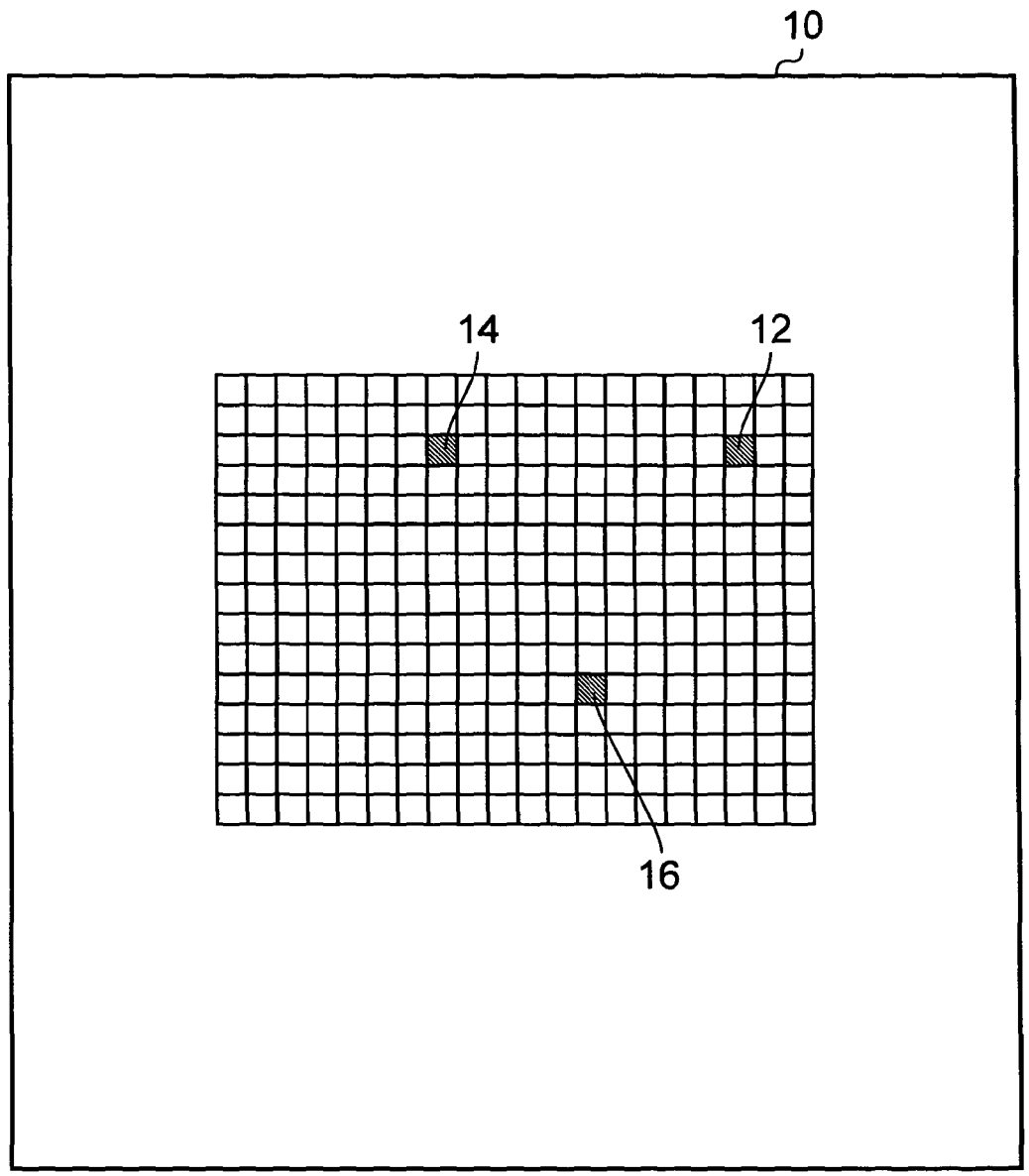
FIG. 1 illustrates a digital image.

FIG. 1 illustrates a digital image 10. The digital image comprises a plurality of pixels, and each pixel has a texture value which is representative of the texture of the article at a respective position. For simplicity, not all pixels of the digital image 10 are illustrated. Some of the pixels of the digital image are illustrated as a 20×15 grid, and within this grid three example pixels 12, 14 and 16 are shown. Each pixel is represented by a location in the digital image and by a single or a plurality of values (representing, for example, grey-level, colour, etc), which will be referred to as the texture value. A texture value for a pixel is a numerical representation of the texture of the article at the position of the location represented by the pixel, for example any numerical value between 0 and 255.

The digital image may comprise medical imaging data, for example soft tissue discrimination imaging data such as magnetic resonance imaging (MRI) data. MRI data is generated by an MRI scanner and the data typically forms a set of digital images which together form 3D/volumetric data.

In the digital image, pixels with texture values within a particular range of texture values may represent a particular texture type. A digital image may comprise different pixels having different texture values which represent different texture types. In known techniques a texture type in a digital image would be determined and classified by a texture classification expert such as a radiologist where the image is a medical image. The radiologist would classify the texture types as "nodular tissue" or "radiolucent tissue" for example.

Figure 2:
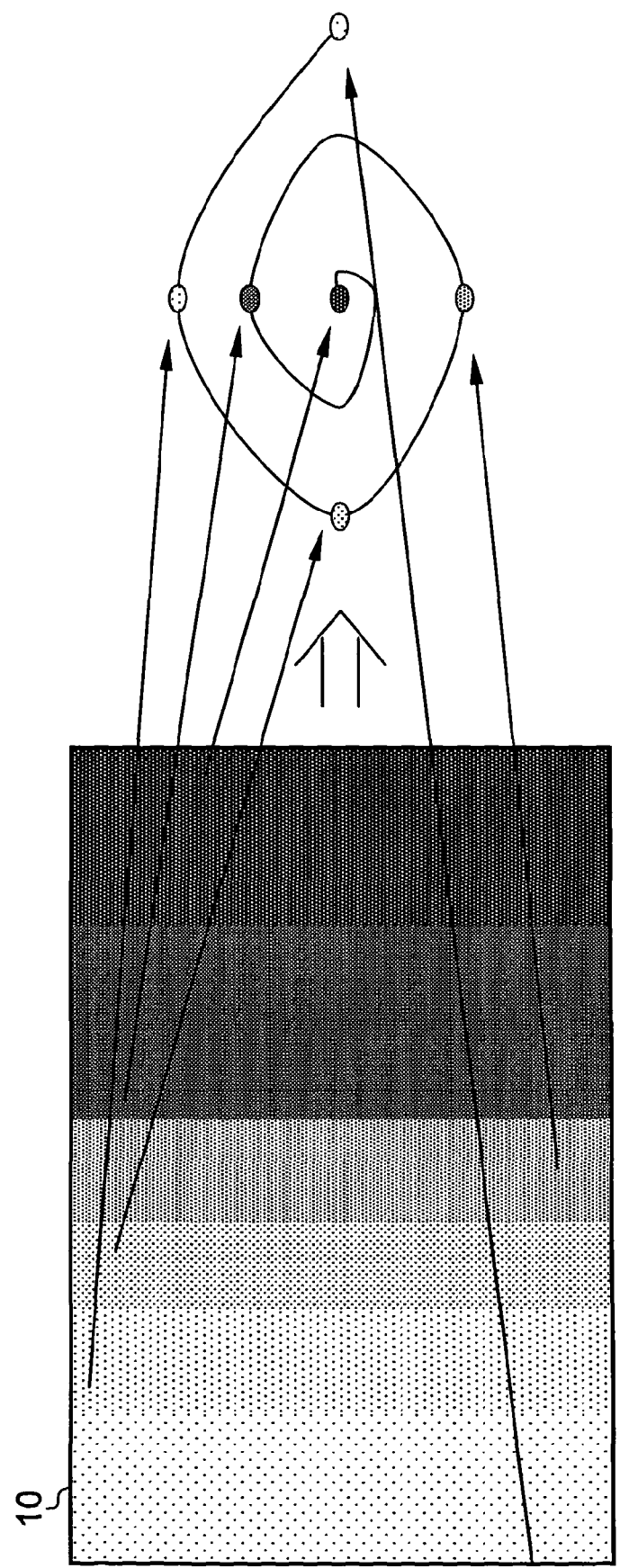
FIG. 2 illustrates reading texture values from the pixels of a digital image.

Embodiments of the present invention are based on the following approach: The data (texture values) held in the digital image in what can be considered "image space" are analysed. One way of conceptualising this is that the data is transformed from image space into "texture value space", which if the texture values comprise two components per pixel can be depicted on a 2D plane, for example as illustrated in FIG. 2. FIG. 2 illustrates a digital image 10 on the left of the drawing being transformed into texture value space on the right of the drawing. The image on the left, although depicted in greyscale, is taken from a colour version where the colours range from pink on the left through red, orange then yellow in the middle before changing through green and then to blue on right hand side. Texture values taken from six particular pixels of the image are illustrated: these texture values in the non-depicted colour version are, from left to right, coloured as pink, red, orange, yellow, green and blue. The texture values of these six pixels are plotted in texture value space (in the colour version the six pixels are coloured pink, red, orange, yellow, green and blue respectively). This transformation can be performed for all of the pixels. If the data set in texture value space is partitioned into discrete local neighbourhoods then the directionality of these neighbourhoods 'point' to their neighbouring neighbourhoods and so reveal the connectivity or topology of the data. The directionality of the data can be found by fitting a line of best fit through the neighbourhoods using a simple linear regression algorithm or other approaches such as principal components analysis. The partitioning of the texture values will be described in more detail with reference to the later figures; however, FIG. 2 illustrates the connectivity of the texture values with a spiral.

As depicted in FIG. 1, a digital image comprises a plurality of pixels having texture values. A subset of the texture values within a particular range of texture values can be considered as a local neighbourhood of texture values. All of the texture values in one or more digital images can be considered as a manifold of texture values. The full set of texture values from one or more digital images is represented by X, and an individual texture value is represented by $x_i$, where i will be range covering all (1 ... n) samples from one or more digital images (e.g. for a single image as shown in FIG. 1 there would be 20 times 15 texture values and n would be equal to 300). The texture values are all real values ($\Re$) and can have dimensionality (D) higher than unity.

The inputs for an embodiment of the present invention are the size (number of texture values) of the local neighbourhoods, k, and a matrix of data points of interest $X=\{x_i\}_{i=1}^n$ sampled from the manifold $\Pi \in \Re^D$.

Figure 3:
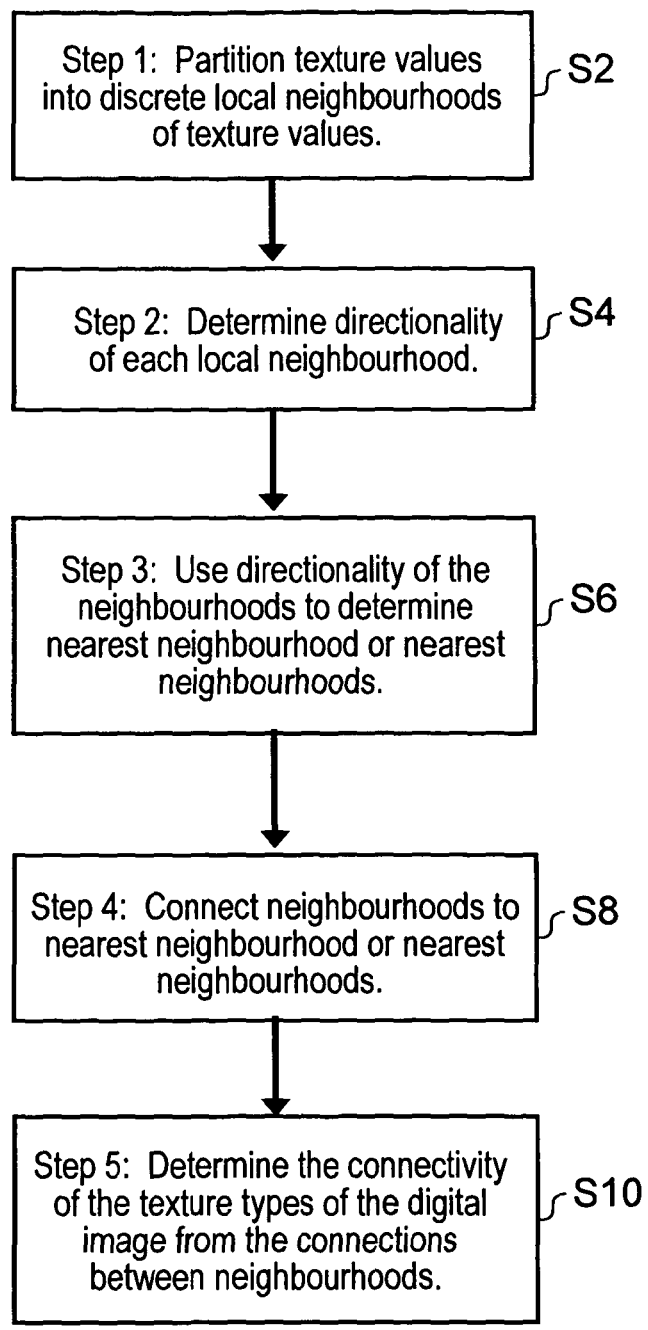
FIG. 3 is a flow diagram showing an embodiment of a method for identifying the connectivity of texture types represented in a digital image.

FIG. 3 is a flow diagram showing an embodiment of a method for identifying the connectivity of texture types represented in a digital image, such as digital image 10 of FIG. 1, comprising pixels, each having a texture value which is representative of texture at a respective position. At step 1, the texture values are partitioned into discrete local neighbourhoods of texture values. At step 2, a directionality for each neighbourhood is determined. At step 3, the directionality of the neighbourhoods is used to determine their nearest neighbourhood or neighbourhoods. At step 4, the neighbourhoods are connected with their nearest neighbourhood or neighbourhoods. At step 5, the connectivity of the texture types of the digital image can be determined from the connections between neighbourhoods. These steps for particular embodiments of the present invention will be described in more detail below.

Step 1: Partition into Local Neighbourhoods.

The first step is to partition the texture values into local neighbourhoods of texture values, $M=\{m_i\}_{i=1}^p$ with p=n/k (which indicates that p is equal to the number of local neighbourhoods and $m_i$ are unique subsets of X), such that $$m_i \subset X$$

$$m_1 \cap m_2 \cap \ldots \cap m_p = X$$

$$M_1 \cup m_2 \cup \ldots \cup m_p = 0$$

The use of a simple clustering algorithm achieves this. In one embodiment a k-means approach is used [see, for example, reference 1] to partition the texture values in the digital image into local neighbourhoods. The k-means algorithm works by choosing a set of p arbitrary cluster center estimates. Each data point is then assigned to its closest cluster and the cluster centers are updated. This process is repeated until no change in cluster centers occurs.

Step 2: Calculate Directionality.

The directionality of the neighbourhoods formed in Step 1 provide us with the information needed to connect neighbourhoods. There are two example approaches that can be taken: finding the principal directionality by using linear regression or finding all directions using principal components analysis.

Figure 4A:
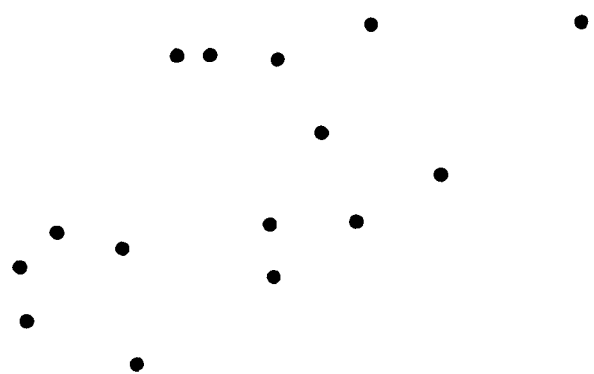
FIG. 4(a) shows an example local neighbourhood of texture values and FIG. 4(b) its boundary and directional information.
Figure 4B:
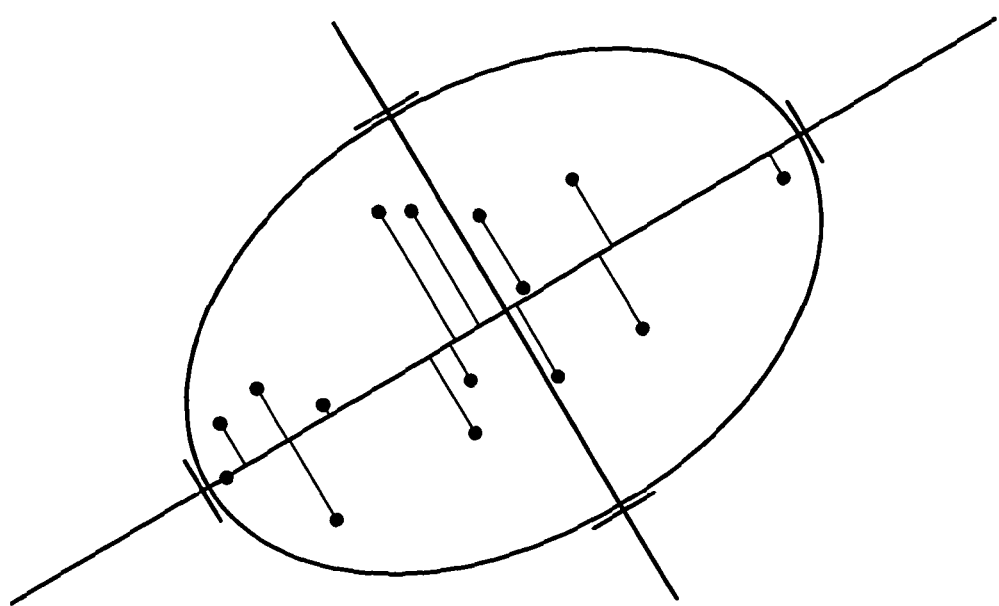

FIG. 4(a) shows an example local neighbourhood of texture values and FIG. 4(b) its boundary and directional information. The longer line which runs from the bottom left to the top right in FIG. 4(b) corresponds to the first principal direction (which can be found by performing linear regression) and the shorter line which runs from the top left to the bottom right corresponds to the neighbourhood's second principal direction. If the principal direction approach to neighbourhood connection is employed then the intersection across any direction that is greater than the threshold, $\alpha$, is used to find inter-neighbourhood connections ($\alpha$ is taken from the range of eigenvalues). The simplest of these two approaches is to employ a simple linear least squares algorithm [see, for example, reference 2] to find the coefficients of the line y=mx+b that is the best fit through the points in the neighbourhood. In the 2-dimensional case we do this by finding the coefficients m and b such that $$m = \frac{\sum x_2 \sum x_1 - n \sum x_1 x_2}{(\sum x_1)^2 - n(x_1^2)}$$

$$b = \frac{\sum x_1 \sum x_1 x_2 - (\sum x_2)(\sum x_1^2)}{(\sum x_1)^2 - n(\sum x_1^2)}$$

This least squares line corresponds to the principal direction of the neighbourhood. It is the same as finding the largest principal component of the neighbourhood and projecting the points in $m_i$ onto this principal component. When determining directionality in high-dimensional space we replace the above line of best fit with the hyper-plane of best fit through the neighbourhood.

A more complex, but also more robust, approach is to find all the directions of the neighbourhood, such as the example neighbourhood shown in FIG. 4(a). This can be done using principal components analysis [see, for example, reference 3]. We begin by forming the covariance matrix C of all points contained in neighbourhood $m_i$. The eigenvectors of $$CW = \lambda W$$

are found and are sorted according to their associated eigenvalues. By projecting the points in $m_i$ onto each of the eigenvectors $\{\gamma_1, \gamma_2, \ldots, \gamma_D\}$ we can find the principal directions of neighbourhood $m_i$. To prevent erroneous connections we introduce a threshold value $\alpha$. That is, if the eigenvalue $\lambda_i < \alpha$ then we discard the eigenvector $\gamma_i$. This allows us more control over the connectivity of the data and means that weak directions can be ignored.

Once the principal directions of the neighbourhood have been found then the coefficients for each of the principal directions can be found using a linear least squares approach as described above.

Steps 3 and 4: Determine and Connect the Nearest Neighbourhood or Neighbourhoods.

Figure 5:
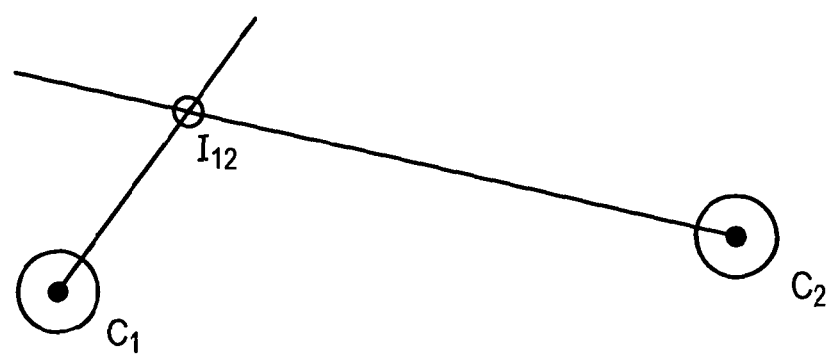
FIG. 5 illustrates how a distance is measured between neighbourhoods.

To determine the nearest neighbourhood or neighbourhoods a connection matrix is formed in one embodiment. The connection matrix can be found using the principal directions of each neighbourhood formed in Step 2. For each direction in each neighbourhood we find the intersection points between every other direction in every other neighbourhood. We then find the distances between the center point of the current neighbourhood and the center points of all the intersecting neighbourhoods. The distance is measured as the distance from the center points via the intersection point. FIG. 5 illustrates how the distance is measured. The connection distance between two neighbourhood center points $C_1$ and $C_2$ is measured as $\|C_1 \cdot I_{12}\| + \|I_{12} \cdot C_2\|$. The smallest 2q connections correspond to the connections (here q corresponds to the number of principal directions used).

The result of this step is a graph G where $G(i,j) = \|m_i \cdot m_j\|$ if neighbourhood $m_i$ and $m_j$ are connected and $G(i,j) = \infty^+$ if not. Here i and j range over all the neighbourhoods.

This approach may produce redundant connections (e.g. two neighbourhoods connected by two edges). To simplify the graph and remove redundant connections we replace the graph G with its minimum spanning tree (MST) [see, for example, reference 4]. A minimum spanning tree is a subgraph of the graph G that connects all vertices with the minimal cost (i.e. has minimum edge set). We use Kruskal's algorithm [see, for example, reference 5] to form the MST. The basic construct of this algorithm is to sort the edges of the graph by weight, we then examine each edge in the order of increasing weight. If the edge examined does not create a cycle (i.e. the possibility to return to itself) with the edges currently in the MST it is added otherwise it is discarded.

Figure 6A:
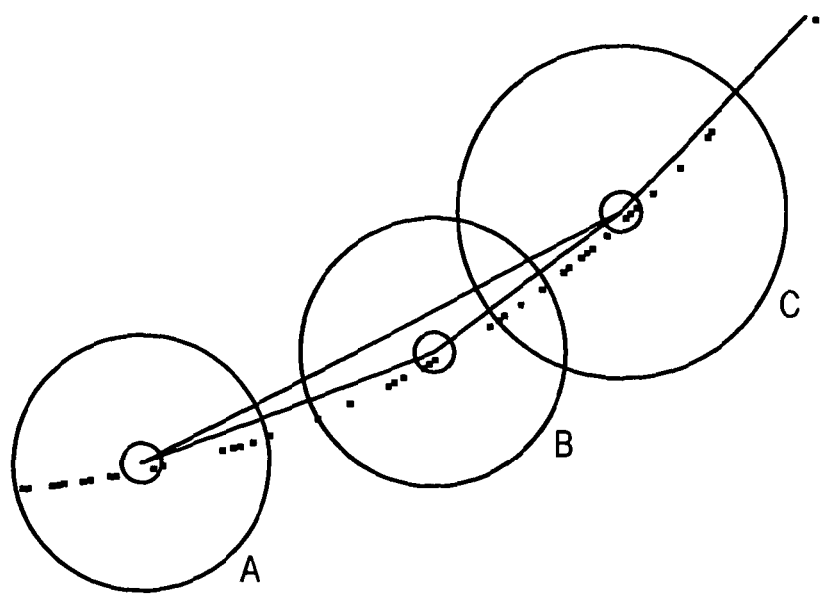
FIGS. 6(a) and 6(b) show experimental results of producing an minimum spanning tree.
Figure 6B:
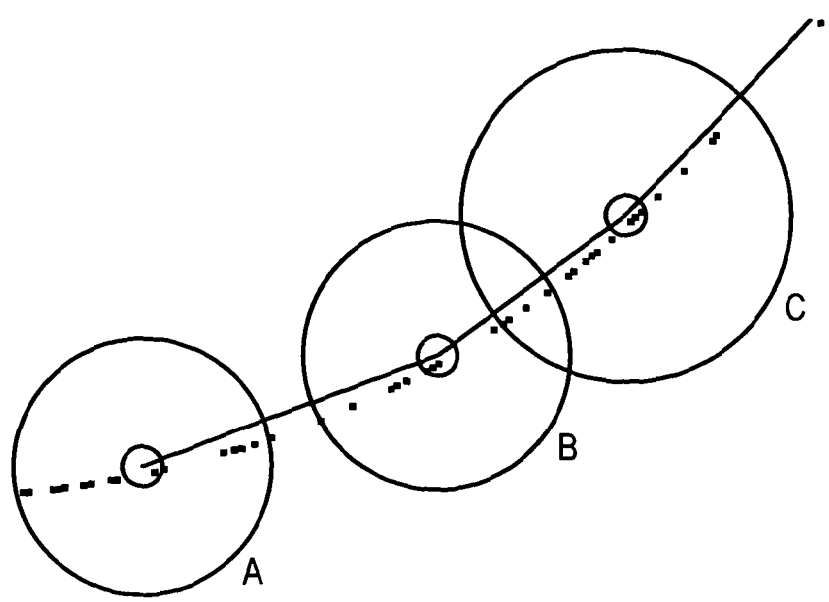

The formation of the minimum spanning tree is useful. FIGS. 6a and 6b illustrate experimental results of producing an MST. As shown in FIG. 6(a) without forming an MST we run the risk of creating erroneous or redundant connections between points. In the above example A is connected to B and C but the connection AC is redundant. However, as shown in FIG. 6(b) the MST produces the correct connectivity ABC. MSTs can also remove dual connections, for example if the connections AB and BA exist then one will be removed as only one is required to represent A being connected to B. The MST can be seen as pruning the graph and providing the most compact possible representation of the graph. The resulting graph G contains the topology of the data set.

Step 5: Determining the Connectivity of the Texture Types of the Digital Image.

The connectivity of the texture types of the digital image can be determined based on the connections formed between neighbourhoods which were made in Step 4. FIG. 9 illustrates the initial transformation from image space to texture value space as already shown in FIG. 2. As illustrated in the figure, and as has now been described with reference to FIGS. 3 to 8, the connections between the neighbourhoods of texture values have been determined, here depicted as a spiral (which can be considered as a topological/connectivity model) A threshold value 18 along the spiral can be set, and depending on the position of a texture values within the model (e.g. in the illustration depending on whether a pixel is on the spiral on one side of the threshold value or the other side) the related pixels can be classified as being of one texture type or another texture type. The texture values of different types can be depicted differently. In the illustration, in the processed image 10' the pixels having one texture type are depicted in black and the pixels of the other texture type are depicted in grey. This process can be performed by taking the spiral/model and the image as inputs and for each pixel reading the texture value and determining which side of the threshold value the texture value belongs. The texture type for the pixel can be assigned accordingly. Step 5 can considered as converting the texture values back into image space.

EXPERIMENTS

Figure 7:
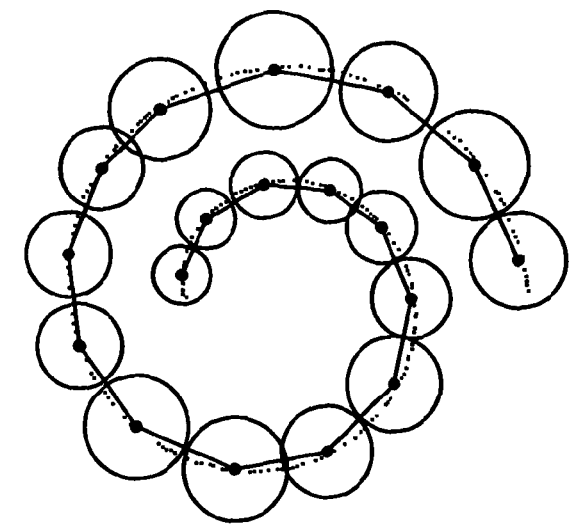
FIGS. 7 and 8 illustrate how the described approach can be used to represent the topology of the data.
Figure 7:
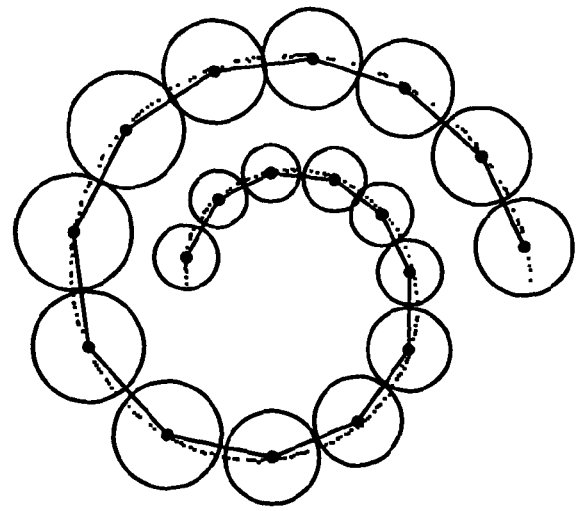
Figure 7:
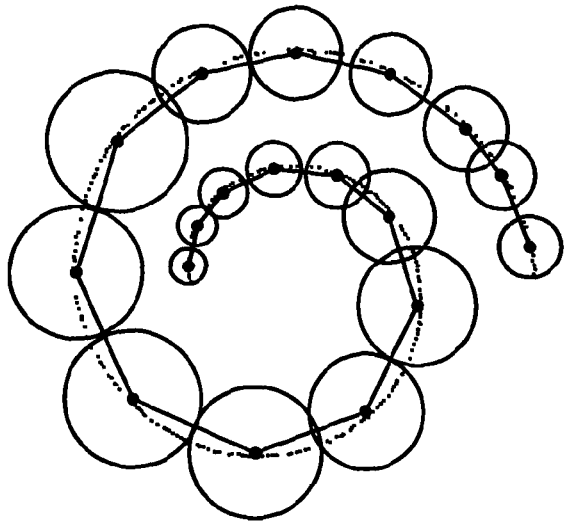

The method described above was tested using a set of 600 points on a highly curved manifold. FIG. 7 illustrates the manifold. Gaussian noise was applied to the data set in increments of 0.5 with $0 \leq \sigma \leq 5$ ($\sigma$ is the standard deviation of the Gaussian noise). The described approach was run over a range of neighbourhood sizes: k=8, 16, 32 (k is equal to the number of texture values in the local neighbourhoods). The results in FIGS. 7 and 8 show how the described approach can be used to represent the topology of the data.

FIG. 7 illustrates the robustness of the results. The results of FIG. 7 show that if the described approach is run multiple times with the same data and parameters the topology will remain the same (even though the neighbourhoods change).

Figure 8:
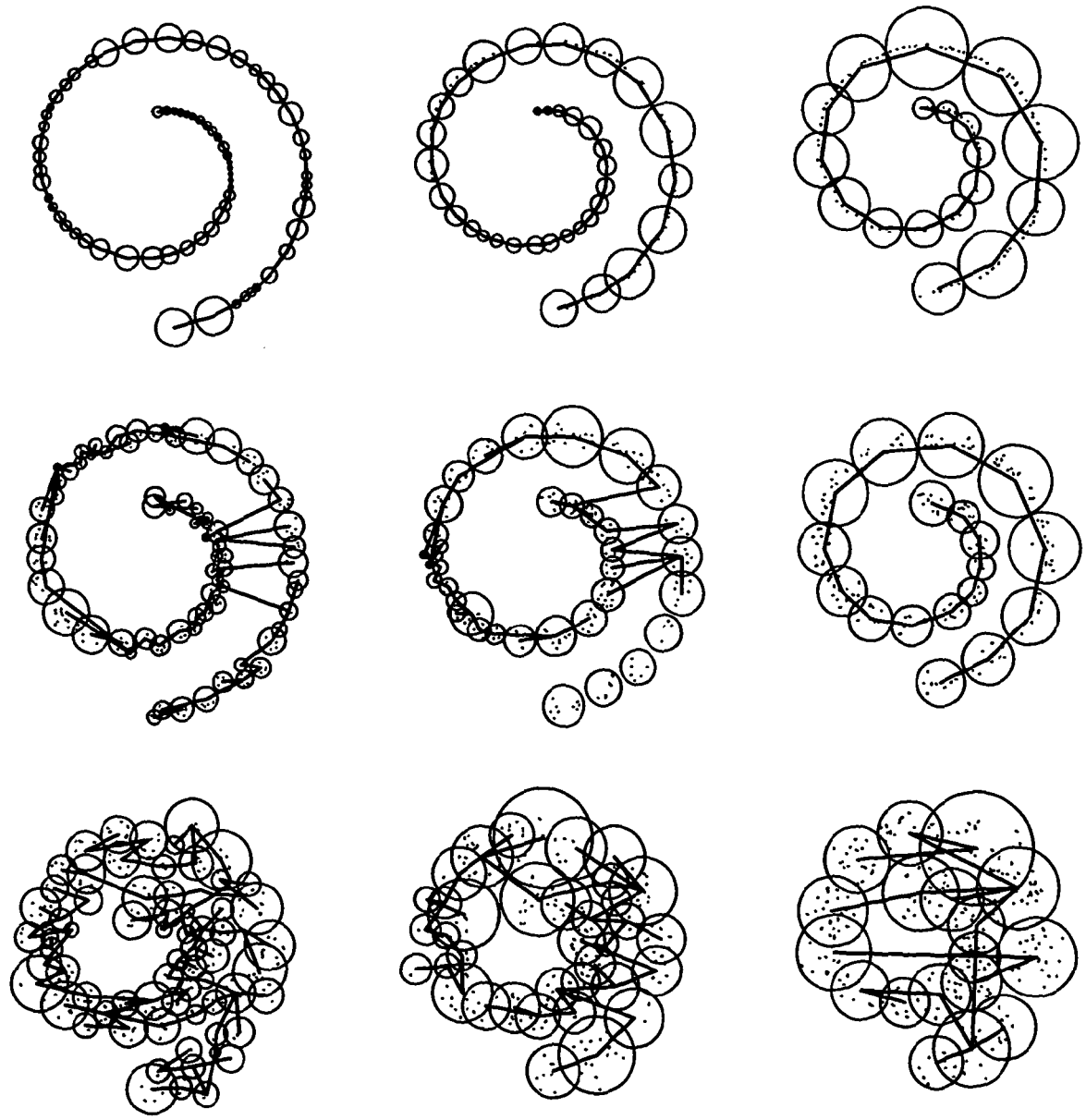
Figure 9:
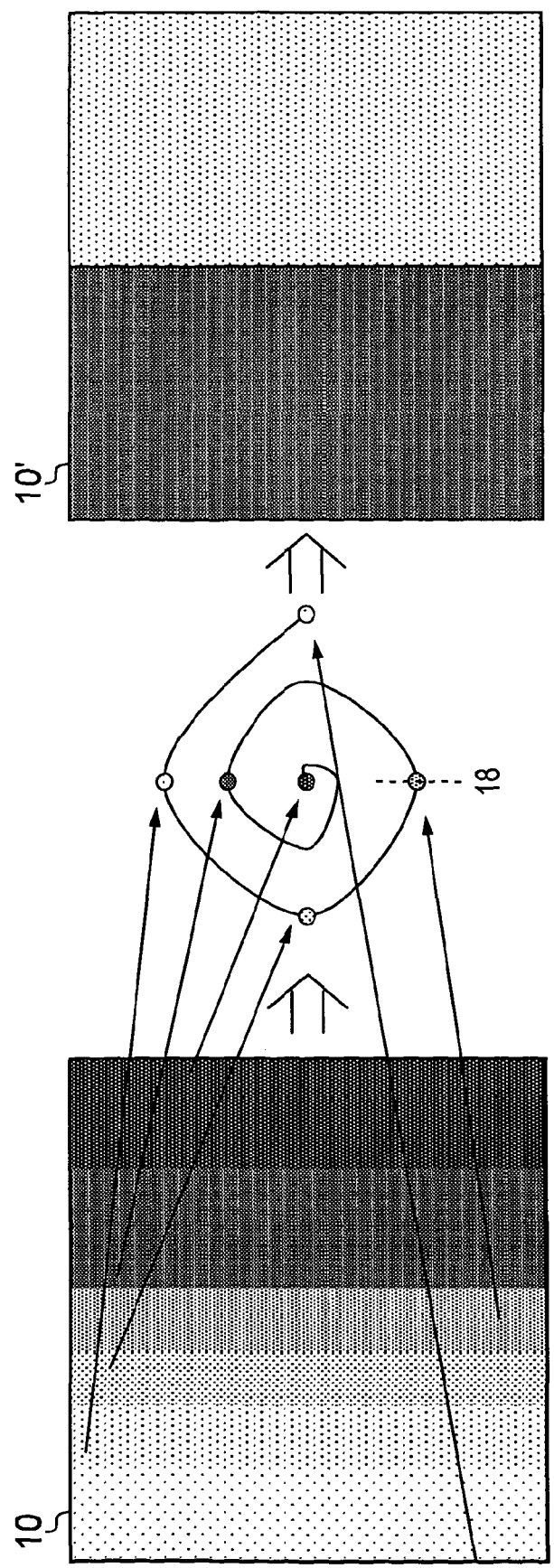
FIG. 9 illustrates the connectivity of the texture types of the digital image being determined from the connections between neighbourhoods

FIG. 8 illustrates identifying the connectivity of texture types using local directionality. The top row ($\sigma=0$, k=8, 16, 32 respectively) shows how the value of the local neighbourhood size does not affect the performance of the topology learning. When noise is added, as shown in the second row ($\sigma=0.5$, k=8, 16, 32), the neighbourhood size begins to affect the performance. A larger neighbourhood reduces the amount of impact that the noise has and the topology can still be learnt. The bottom row ($\sigma=1.5$, k=8, 16, 32) shows how noise can heavily affect the performance. Noise hides any directional aspects contained within the local neighbourhoods and so the topology cannot be found.

A system or computer such as a general-purpose computer can be configured or adapted to perform the described methods. In one embodiment the system comprises a processor, memory, and a display. Typically, these are connected to a central bus structure, the display being connected via a display adapter. The system can also comprise one or more input devices (such as a mouse and/or keyboard) and/or a communications adapter for connecting the computer to other computers or networks. These are also typically connected to the central bus structure, the input device being connected via an input device adapter.

In operation the processor can execute computer-executable instructions held in the memory and the results of the processing are displayed to a user on the display. User inputs for controlling the operation of the computer may be received via input device(s).

A computer readable medium (e.g. a carrier disk or carrier signal) having computer-executable instructions adapted to cause a computer to perform the described methods may be provided.

Embodiments of the invention have been described by way of example only. It will be appreciated that variations of the described embodiments may be made which are still within the scope of the invention.

For example, although not a limited list, the techniques can be used to analyse texture in images in the fields of medical imagery, materials science, food science, and satellite, airborne and other remote sensing imagery. In medical imagery, CT (computed tomography), MRI, Ultrasound, PET (positron emission tomography), microscopy images of human or animal tissues, cells, bones or nerves can be processed. In materials science, images of materials such as manufactured fabrics or metals, or raw materials can be processed for quality assurance purposes. Similarly, in food science, images of finished products or raw materials can be processed for quality assurance purposes. In satellite, airborne and other remote sensing imagery, images can be processed for automated and knowledge based mapping of weather patterns, geographical features (e.g. wet lands/drought), topological and geological structures (e.g. dunes/coastline/riverbeds/mountains), plants (e.g. crop types/woodland density and edges), animals (e.g. insect swarms/herds/flocks/classification), and man-made features (e.g. traffic congestion/road boundaries). It will be appreciated that in each case a different article or articles are scanned. Typically, the digital image is therefore a scanned digital image or, more particularly, a scanned digital image of a real world article or articles (or entity/entities or object/objects).

REFERENCES

The following documents are incorporated herein in their entirety by reference thereto.

[1] J. A. Hartigan and M. A. Wong. A k-means clustering algorithm. *Journal of the Royal Statistical Society*, 28(1): 100-108, 1979.
[2] C. Lawson and R. Hanson. *Solving Least Squares Problems*. Society for Industrial Mathematics, 1987.
[3] H. Hotelling. Analysis of a complex of statistical variables into principal components. *Journal of Educational Psychology*, 24:417-441, 1933.
[4] R. L. Graham and P. Hell. On the history of the minimum spanning tree problem. *Annals of the History of Computing, IEEE*, 7:43-57, 1985.
[5] J. B. Kruskal. On the shortest spanning tree of a graph and the traveling salesman problem. *Proceedings of the American Mathematical Society*, 7:48-50, 1956.

The invention claimed is:

1. A method for identifying the connectivity of texture types represented in a digital image comprising pixels, each pixel having a texture value which is representative of texture at a respective position, the method comprising:
    partitioning the texture values into local neighbourhoods of texture values;
    determining a directionality for each neighbourhood;
    using the directionality of the neighbourhoods to determine their nearest neighbourhood or neighbourhoods;
    connecting the neighbourhoods with their nearest neighbourhood or neighbourhoods; and
    determining the connectivity of the texture types of the digital image based on the connections formed between neighbourhoods.

2. A method according to claim 1, wherein partitioning the texture values into local neighbourhoods of texture values comprises using a clustering algorithm.

3. A method according to claim 1, wherein determining a directionality for each neighbourhood comprises using linear regression.

4. A method according to claim 1, wherein determining a directionality for each neighbourhood comprises using principle components analysis.

5. A method according to claim 1, wherein using the directionality of the neighbourhoods to determine their nearest neighbourhood or neighbourhoods and connecting the neighbourhoods with their nearest neighbourhood or neighbourhoods comprises:
    determining the intersections between directionalities of neighbourhoods and identifying the nearest neighbourhood or neighbourhoods for a neighbourhood as the one or more neighbourhoods which form an intersection at across the shortest distance or distances.

6. A method according to claim 5, wherein a connection matrix is used.

7. A method according to claim 5, further comprising removing redundant connections.

8. A method according to claim 1, wherein the digital image comprises medical data.

9. A method according to claim 8, wherein the digital image comprises medical data of soft tissue.

10. A system comprising a memory and a processor, wherein the processor is arranged to perform the method of claim 1.

11. A non-transitory computer-readable medium having computer-executable instructions adapted to cause a computer system to perform the method of claim 1.

* * * * *